April 22, 1941.  T. W. JOHNSON  2,239,387
TRACTOR MOUNTED CULTIVATOR
Filed Sept. 8, 1939
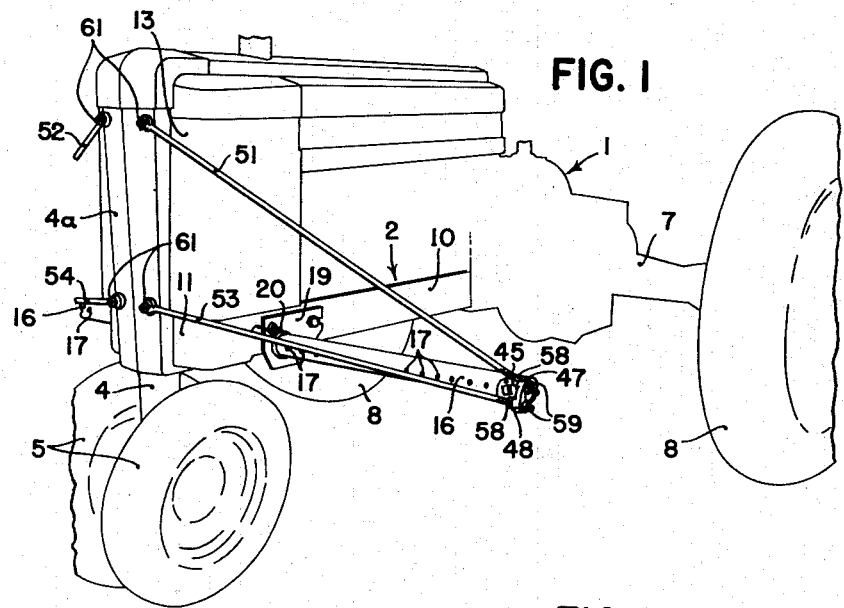
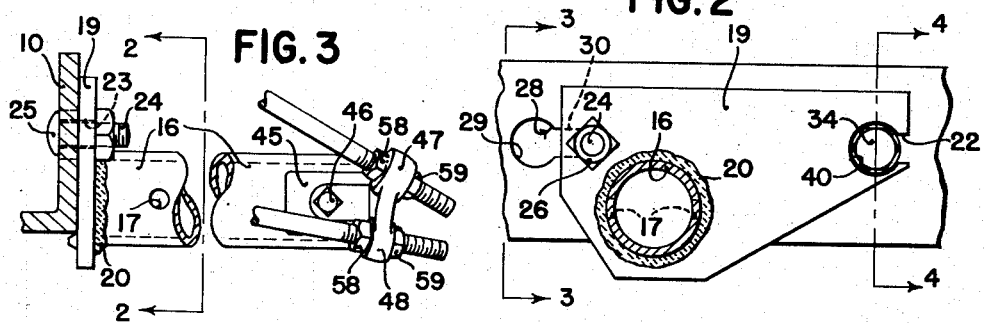
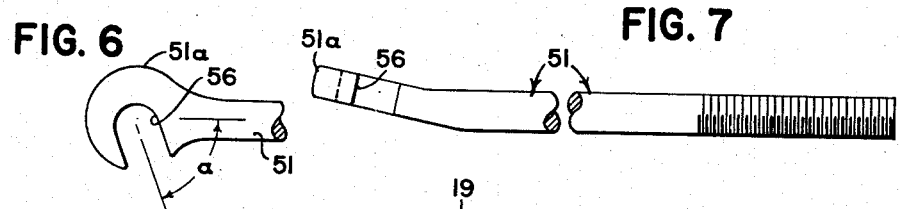
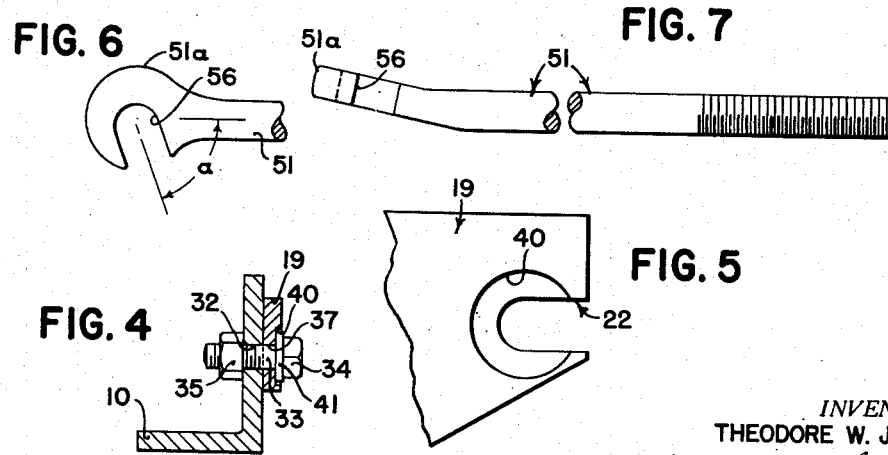
INVENTOR:
THEODORE W. JOHNSON
BY
ATTORNEYS.

Patented Apr. 22, 1941

2,239,387

UNITED STATES PATENT OFFICE 2,239,387

TRACTOR MOUNTED CULTIVATOR

Theodore W. Johnson, Moline, Ill., assignor to Deere & Company, Moline, Ill., a corporation of Illinois Application September 8, 1939, Serial No. 293,973

31 Claims. (Cl. 97—47)

The present invention relates generally to agricultural implements and more particularly to tractor-mounted cultivators and similar machines.

The object and general nature of this invention is the provision of new and improved quick detachable connections for mounting implements on a tractor or other carrying and/or propelling units, and more specifically it is a feature of the present invention to provide an improved quick detachable connection for the transverse draft beams of a tractor cultivator, which is generally fixed to the tractor adjacent the forward end.

More specifically, it is a feature of this invention to provide a quick detachable connection for a cultivator draft beam, which includes one or more keyhole slots formed in the tractor frame and associated bolt means carried upon the draft beam in such relation that the beam may be quickly attached to or detached from the tractor, as desired. Further, in this connection it is an additional object of the invention to provide a new and improved brace rod structure adjustably connected to the outer end of the associated draft beam and particularly constructed so as to be quickly attachable to and detachable from the tractor without disturbing the adjustment setting at the connection between the brace rods and the draft beam. Also, it is a feature of the invention to form the brace rods so that, while quickly detachable from the tractor, there is little possibility of the rods becoming detached accidentally.

These and other objects of the present invention will be apparent to those skilled in this art after a consideration of the following detailed description of the preferred structural embodiment, taken in conjunction with the accompanying drawing illustrating the preferred embodiment.

In the drawing:

Figure 1 is a perspective view showing the manner of attaching a pair of cultivator draft beams to a tractor according to the principles of this invention;

Figure 2 is an enlarged fragmentary sectional view showing the preferred bolt and slot means by which the attaching plate at the inner end of each draft beam is detachably secured to the tractor frame;

Figure 3 is a view taken generally along a line 3—3 of Figure 2;

Figure 4 is a section taken generally along a line 4—4 of Figure 2;

Figure 5 is a fragmentary view showing the portion of the beam attaching plate which is recessed to receive appropriate means by which longitudinal movement of the attaching plate relative to the tractor frame is prevented; and Figures 6 and 7 show the general formation of the brace rods which preferably extend from the outer end of each draft beam to the forward and upper portions of the tractor.

Referring now more particularly to Figures 1, 2 and 3, the tractor is indicated in its entirety by the reference numeral 1 and includes a frame 2 supported upon a front pedestal carrying steerable front wheels 5 and a rear axle 7 carrying driving wheels 8. The tractor frame 2 consists of a pair of generally parallel angle members 10 suitably connected, by welding or otherwise, to a front yoke 11 which forms a part of the pedestal 4, the latter extending upwardly, as at 4a, to form the front of the tractor to which the brace rods may be attached as will be explained later. Generally, the radiator and radiator shell, as indicated at 13 in Figure 1, are carried by the tractor frame just rearwardly of the pedestal section 4a.

Generally, when attaching such implements as cultivators at the forward end of the tractor, a pair of laterally outwardly extending draft beams are employed, and in the present instance the two outwardly extending draft beams are indicated at 16 in Figure 1, and preferably the draft beams are in the form of pipe members having sets of openings 17 which serve as means whereby various tools and the like may be mounted thereon. According to the present invention, a mounting plate 19 is secured to the inner end of each pipe member 16 in any suitable manner, as by welding, as indicated at 20, and from Figures 1 and 3 it will be noted that the mounting or attaching plate 19 is disposed in a plane at right angles to the axis of the associated draft beam 16. Generally speaking, the attaching plate 19 is of generally triangular formation, and at one end carries an open slot 22 (Figures 2 and 5) and at the other end is apertured, as at 23 (Figure 3) and carries an attaching bolt 24 provided with a head 25 at the inner side and a clamping nut 26 at the outer side.

Each of the tractor frame members 10 carries or is formed with a keyhole slot 28, the larger portion 29 of which is adapted to permit the head 25 of the bolt 24 to pass therethrough. The keyhole slot 28 includes a smaller section 30 which is approximately the same width as the diameter of the bolt 24. Rearwardly of the keyhole or buttonhole slot 28 each tractor frame member 10 is provided with an aperture 32 (Figure 4) in which a bolt 33 may be loosely disposed. The bolt 33 includes a head 34 disposed at the outer side of the frame member 10 and a clamping nut 35 at the inner side. The longitudinal spacing between the keyhole slot 28 and the hole 32 in the tractor frame member 10 corresponds to the spacing between the hole 23 in the forward portion of the attaching plate 19 and the slot 22 formed in the rear end thereof, as mentioned above.

It will be apparent from the above description that each draft beam or pipe member 16 may be attached merely by bringing the plate 19 up into position and then engaging the slot 22 under the head 34 of the bolt 33 and inserting the head 25 of the bolt 24 through the larger portion 29 of the keyhole slot 28, then sliding the plate 19 rearwardly until the slot 22 bottoms against the bolt 33 and the bolt 24 bottoms in the rear end of the keyhole slot 28. Then by tightening the bolts 24 and 33, the plate 19 and the attached draft beam 16 are firmly fixed in position.

It will be noted that the mounting plate 19 is moved into position by a rearward movement and that this is the direction in which the pressure of the soil being worked normally acts against the draft beams. Hence, there is no likelihood of either draft beam working rearwardly out of proper position during operation. Although normally working pressures acting against the draft beams 16 tend to force them rearwardly of the tractor, it sometimes occurs, as when backing or the like, that a force tending to move the draft beams 16 forwardly may arise, and in such a case it is desirable to have means locking the draft beams against inadvertent forward movement out of proper position as well as means preventing the draft members from shifting rearwardly. To this end, each of the attaching plates 19 is counterbored at the inner end of the open end slot 22 to form a recess 40 (Figures 2, 4 and 5) which is adapted to receive a heavy washer 41 carried on the bolt 33 between the head 34 thereof and the associated attaching plate 19. Normally, the washer 41 fits tightly within the recess 40 so that when the nut 35 on the inside of the vertical flange of the tractor frame member 10 is tightened, not only is the rear portion of the attaching plate 19 clamped to the tractor frame member 10, but, in addition, the seating of the washer 41 in the recess 40 effectively secures the attaching plate to the frame member 10 and locks the same against either forward or rearward shifting movement relative to the tractor. In addition, the provision of the washer 41 underneath the head 34 of the bolt 33 facilitates attaching the draft beam 16 and plate 19 to the tractor in that the washer serves to guide and locate the plate 19 once the slot 22 engages the bolt 33. I consider that this is an important feature of the present invention, particularly in the ability of the above described means to prevent forward shifting movement of the plate 19 relative to the tractor frame 10 supporting it.

The draft beams or pipe members 16 may be reinforced by pairs of truss or brace rods, preferably connected between the outer end of each beam 16 and the upper pedestal section 4a of the tractor. The outer end of each of the draft beams 16 is provided with a truss rod bracket 45 secured to the associated beam 16 by a bolt 46 or other appropriate means, and each bracket 45 is provided with a pair of brace rod receiving sections 47 and 48 suitably apertured and extending at an angle to one another as best shown in Figure 3. Pairs of upper and lower right and left hand truss rods 51, 52 and 53, 54 are provided and are of the general formation best shown in Figures 6 and 7, which illustrate the upper left hand truss rod 51. As best shown in Figure 7, the outer end of each truss rod is threaded and the inner end is flattened, as at 51a, 52a, etc., and the flattened inner end of each rod is bent at an angle to the general longitudinal axis of the rod. Also, each flattened section is provided with a slot or notch 56 (Figure 6) which is open to form a hook-like end for the rod and which extends outwardly toward the threaded end of the rod at an acute angle, indicated at $a$ in Figure 6. The threaded end of each truss rod carries a pair of adjusting nuts 58 and 59, and the upper section 4a of the tractor pedestal 4 is provided with means to receive four cap screws 61.

As will be observed from Figure 1, the lower truss rods 53 and 54 reinforce the draft beams 16 against being displaced rearwardly while the upper truss rods 51 and 52 reinforce the draft beams 16 against being deflected rearwardly under the weight of the attached tools. After the hook ends 56 are engaged over the associated cap screws 61, the nuts 58 and 59 are adjusted and tightened to bring the outer end of the beam 16 into and to hold it in its proper position. Generally speaking, the inner nuts 58 determine the position of the outer end of the associated draft beam 16 while the outer nuts 59 serve to clamp the bracket in place. After the ends 56 of the truss rods are engaged over the associated cap screws 61, the latter are tightened to hold them in place. The hook end of each of the rods is bent, as shown in Figure 7, so as to accommodate the positions of the cap screws 61 at the forward end of the tractor and the position of the draft beam 16 to the rear thereof, whereby each rod extends practically directly in a straight line from the associated cap screw 61 to the outer end of the draft beam.

Once the truss rods have been fixed in proper adjusted position to their associated draft beams 16, it is rarely necessary to change the adjustment of the inner nuts 58. In attaching the draft beams and their associated truss rods to the tractor, the cap screws 61 and the outer adjusting nuts 59 are first loosened, and then the unit is lifted into a position in which the notches 56 may be engaged with the associated cap screws 61. Next the inner end of the draft beam 16 is attached to the tractor frame 10 by engaging the bolt 24 in the keyhole slot 28 and engaging the slot 22 with the bolt 33. Next the bolts 24 and 33 and the nuts 59 are tightened, which thereby fixes the draft beam in proper position and then the cap screws 61 are tightened. It will be noted that the angle $a$ (Figure 6) is such that the truss rods cannot become disengaged from the cap screws 61, even though the latter are not tightened, except by loosening the outer nuts 59 and shifting the truss rods longitudinally a small amount in the truss rod bracket 45. Therefore, in detaching the unit, the nuts 59 are loosened, but the other nuts 58 remain in position and therefore serve to locate the truss rods when the unit is subsequently attached to the tractor. Even after the cap screws 61 and nuts 59 are loosened, the draft beam is, in a measure, supported on the tractor so that when the bolts 24 and 33 are loosened, the inner end of the draft beam 16 may be disengaged from the tractor frame by swinging the unit generally about its support on the cap screws 61.

The particular advantage of the above described bolt and slot means connecting the mounting plate 19 of each of the draft beams 16 to the tractor, wherein the keyhole slot 28 at the forward portion of the connection is formed in the tractor frame while the rear slot 22 is formed in the attaching plate with the associated bolt means 33 carried by the tractor, is that the radiator 13 and associated parts at the forward end of the tractor, adjacent the keyhole slot 28, would prevent convenient access to the inside of the tractor frame at this point; hence, the carrying of the bolt means 24 by the mounting plate 19 disposes the clamping nut 26 on the outside, and hence at a point convenient to the operator. On the other hand, the disposition of the rear bolt means 33, with the clamping nut 35 on the inside, is such that the operator may conveniently reach the bolt 35 for tightening the same, and further, this permits the disposition of the locating washer 41 on the outside of the mounting plate 19 where it may be seen and where the operator can immediately tell upon inspection that the mounting plate 19 is effectively secured against longitudinal shifting movement. The bolt means 33 is only loosely mounted in the opening 32 of the tractor frame, and hence when the units are detached it is a simple matter also to remove the bolts 33, whereby the tractor presents a clean appearance and there are no protruding parts to interfere with the attachment of other units. Ordinarily, however, the bolt means 33 may be left attached to the tractor, even though the draft beams 16 and associated parts are removed. If desired, of course, other arrangements of the bolt and slot means may be employed, but the arrangement described above is preferred. However, by way of example, it may be mentioned that the bolt means 24 may be disposed in a hole, not a keyhole slot, in the tractor frame and the attaching plate 19 may be provided with a keyhole slot if desired. Other contemplated arrangements, as defined by the appended claims, will be recognized by those skilled in the art as falling within the scope of the present invention.

What I claim, therefore, and desire to secure by Letters Patent is:

1. A quick detachable connection for attaching one member of an agricultural implement to another member, comprising a slot formed in one member, means serving as a bolt carried by the other member and adapted to be received in said slot, and cooperating means on said bolt and the adjacent portion of said one member for preventing relative movement between said members when said bolt means is tightened.

2. The combination of a tractor having a generally longitudinally extending frame member, a draft beam extending generally transversely of the tractor and carrying at its inner end an attaching plate member, there being a slot in one of said members, bolt means carried by the other member and adapted to be inserted through said slot and tightened to detachably secure said plate member and said draft beam to the longitudinally extending frame member of the tractor, and cooperating means on said bolt means and the adjacent portion of said one member for preventing movement of one member relative to the other when said bolt means is drawn up against said one member but before said bolt means has been tightened.

3. The combination of a tractor having a generally longitudinally extending frame member, a draft beam adapted to be detachably connected with the tractor and including an attaching plate member, means carried by the frame member and adapted to secure said plate member and said beam to said frame member of the tractor, and means on the plate member to receive said securing means for preventing relative movement between the plate and frame members before said securing means is completely tightened.

4. A quick detachable connection for agricultural implements and the like for attaching one member to the other, comprising a slot formed in each member, and bolt means carried by each member in spaced relation with respect to the slot associated therewith, the bolt means on each member serving to receive the slot of the other member.

5. The combination with a tractor having a generally longitudinally extending frame member, of a draft beam having an attaching member at its inner end, there being a slot formed in one of said members, bolt means carried by the other member and adapted to be inserted through said slot and tightened to fix said draft beam to the tractor, a bracket fixed to the outer end of said draft beam, and a brace rod connected at its outer end to said bracket and at its inner end with the tractor above said frame member.

6. The combination set forth in claim 5, further characterized by a second brace rod connected at its outer end to said brace rod, said bracket having an apertured angled section to receive both of said brace rods and to accommodate one rod being disposed at a greater angle than the other, relative to said draft beam.

7. The combination set forth in claim 5, further characterized by said attaching member comprising a generally triangular plate having one apex portion disposed downwardly, said frame member being attached to said downwardly extending apex portion, said bolt means extending through one of the other apex portions, and a second bolt and slot means situated at the other apex portion of said triangular plate for connecting the latter to said frame member.

8. The combination with a tractor having a generally longitudinally extending frame member and a part carried by the frame member, of a draft beam having an attaching member at its inner end, there being a keyhole slot formed in said frame member adjacent said part, bolt means carried by said attaching member and adapted to be inserted through said keyhole slot and tightened to fix said draft beam to the tractor, said attaching member having a countersunk recess adjacent the slot in said attaching member, and a locating washer carried by said second bolt means and adapted to seat in said recess for holding said attaching member and the draft beam against movement relative to said frame member when the second bolt means is tightened.

9. In a tractor having a generally longitudinally extending frame member, the combination of a laterally extending draft beam having an attaching plate at its inner end disposed generally at right angles to the draft beam, a pair of bolt and slot means for fixing said attaching plate to said longitudinally extending frame member, and means associated therewith for preventing longitudinal movement of said attaching member relative to said frame member.

10. In combination, a tractor having a generally longitudinally extending frame and a generally vertical pedestal at one end thereof, a laterally outwardly extending draft beam having an attaching plate at its inner end, bolt and slot means operatively connecting said plate member to said frame and accommodating limited longitudinal movement of said plate member relative to the frame in attaching and detaching the draft beam, and brace means extending from said tractor pedestal to the outer end of said draft beam and accommodating longitudinal movement of the inner end of the latter relative to said tractor frame.

11. The combination set forth in claim 10, further characterized by said brace means including an outer end bolted to the outer end of said draft beam and the inner end of said brace including a hook-like end adapted to be engaged with a part on the tractor pedestal.

12. The combination as set forth in claim 10, further characterized by a bracket fixed to the outer end of said draft beam, a pair of links bolted thereto at their outer ends, the inner ends of said links being formed as a hook, and a pair of vertically spaced studs carried by said pedestal to receive the inner ends of said links while supporting the draft beam in a position to engage the bolt and slot means and tighten the same for fixing the inner end of the draft beam to the tractor frame.

13. The combination set forth in claim 10, further characterized by said brace having its inner end formed with a slot which extends at an angle with respect to the longitudinal axis of the brace less than a right angle, whereby generally inward longitudinal movement of the brace is required to detach the same from the tractor.

14. A cultivator comprising the combination with a tractor of a cultivator beam fixed at its inner end to the tractor, a bracket carried at the outer end of said beam, a brace having its outer end threaded and received by said bracket, nuts carried by the threaded end of said brace on opposite sides of the bracket, the inner end of said brace having a hook-like end formed by a slot extending at an oblique angle with respect to a line joining the inner and outer ends of said brace, and a stud carried by the tractor to receive the hook-like inner end of said brace, and means for attaching the inner end of said draft beam rigidly to said tractor, loosening the outer nut on said brace permitting the latter to be shifted longitudinally an extent sufficient to disengage the hook-like inner end of the brace from said stud.

15. A brace rod for a cultivator or the like, comprising an elongated member threaded at one end and having a flattened section at the other end, said flattened section having a notch formed therein extending generally at an oblique angle with respect to the general longitudinal axis of said rod.

16. A draft beam for a cultivator or the like, comprising a pipe member, an attaching plate secured to one end of said member, and a bolt receiving opening formed in said plate and having a counterbored recess about said opening.

17. In a cultivator, a draft beam having an attaching plate secured to the inner end of said beam and a brace rod receiving bracket fixed to the outer end of said beam.

18. The combination with a tractor having a front pedestal provided with a pair of vertically spaced brace receiving studs and a frame member provided with a pair of longitudinally spaced openings, the opening adjacent said pedestal being in the form of a keyhole slot, of a draft beam structure comprising a transversely disposed member having a plate secured secured thereto at its inner end, said plate carrying bolt means adapted to be engaged with said frame member in said keyhole slot, said plate having an open end slot spaced from said bolt means, a recess disposed adjacent said open end slot, bolt means adapted to extend through said open end slot and the other of said frame member openings, means on said bolt means to engage in said recess and lock the plate against longitudinal movement relative to the tractor, a brace receiving bracket secured to the outer end of said beam and having two apertured brace receiving sections and a pair of brace rods, the inner end of each having a transverse slot formed therein and adapted to engage the upper and lower tractor studs, the slot in the inner end of each of said brace rods being disposed at an angle relative to the longitudinal axis of the brace rod whereby longitudinal movement of the latter is required to disengage either brace rod from the associated tractor stud, and means adjustably fixing the outer end of each of said brace rods to said draft beam bracket.

19. In combination, a tractor having a generally longitudinally extending frame and a generally vertically extending part at one end thereof, a laterally outwardly extending draft beam having an attaching plate at its inner end, bolt and slot means operatively connecting said plate member to said frame and accommodating limited longitudinal movement of said plate member relative to the frame in attaching and detaching the draft beam, and brace means extending said vertically extending part to the outer end of said draft beam.

20. In combination, a tractor having a generally longitudinally extending frame and a generally vertically extending part at one end thereof, a laterally outwardly extending draft beam having an attaching plate at its inner end, each of said frame and said plate having one or more bolt holes therein and the hole or holes in said plate being disposed above said draft beam, and brace means extending downwardly and rearwardly from the upper part of said vertically extending part and the outer end of said draft beam.

21. The combination set forth in claim 20, further characterized by a bracket at the laterally outer end of said draft means, and adjustable means fixing the outer end of the brace means thereto.

22. The combination set forth in claim 20, further characterized by said brace means comprising a rod and said vertically extending part on the tractor carrying a stud, means detachably connecting the upper and inner end of said rod to said stud, an apertured bracket at the outer end of said draft beam to receive the outer end of said rod, said outer end of the rod being threaded, and a pair of nuts, one on each side of said bracket, for adjustably fixing the outer end of the rod to said bracket.

23. The combination set forth in claim 20, further characterized by said brace means comprising a rod and said vertically extending part on the tractor carrying a stud, means detachably connecting the upper and inner end of said rod to said stud, a bracket at the outer end of said draft beam, said bracket having a pair of apertures therein, the outer end of said brace rod being threaded and insertible into one of said bracket apertures, a pair of nuts, one on each side of said bracket, for adjustably fixing the outer end of the rod to said bracket, and a second brace rod connected at its inner end with the tractor below the inner end of said first mentioned brace rod, the outer end of said second brace rod being threaded and insertible into the other aperture in said bracket, and a pair of nuts, one on each side of said bracket, for adjustably fixing the outer end of said second brace rod to said bracket.

24. A draft beam for a cultivator or the like, comprising a pipe member, and a generally triangular attaching plate having its lower apex portion fixed to one end of said pipe member with its other apex portions disposed generally in the same horizontal plane, there being bolt receiving openings in said horizontally disposed apex portions generally above said pipe member.

25. A draft beam for a cultivator or the like adapted to be secured to a part to carry the beam, said draft beam comprising a pipe member, an attaching plate secured to one end of said member, bolt means for connecting said attaching plate to said part, and means on the attaching plate separate from said bolt means for temporarily preventing movement of said draft beam along said part until said bolt means is tightened.

26. In a cultivator, a draft beam having an attaching plate secured to the inner end of said beam and a brace rod receiving bracket fixed to the outer end of said beam, said brace rod receiving bracket including a section secured to said beam and an apertured section disposed in a plane at an angle to said first section.

27. In a cultivator, a draft beam having an attaching plate secured to the inner end of said beam and a brace rod receiving bracket fixed to the outer end of said beam, said brace rod receiving bracket including a section secured to said beam and an apertured section disposed in a plane at an angle to said first section, and a brace rod adapted to be fixed to said apertured bracket section in a position at an angle with respect to said draft beam.

28. In a cultivator, a draft beam having an attaching plate secured to the inner end of said beam and a brace rod receiving bracket fixed to the outer end of said beam, said brace rod receiving bracket including a section secured to said beam and a pair of apertured sections disposed at an angle to one another and to said draft beam, and a pair of brace rods adapted to be fixed, respectively, to said apertured sections and to extend generally at an angle to said draft beam in divergent relation from said bracket generally inwardly of said draft beam.

29. The combination with a tractor having a vertically extending part and a frame member having a pair of bolt receiving holes, at least one of which is a slot, of a brace receiving stud carried by said part, a draft beam structure comprising a transversely disposed member having a plate secured thereto at its inner end and a brace receiving bracket secured thereto at its outer end, said plate having a pair of bolt holes therein, bolt means adapted to extend through said bolt holes in said plate and frame member, means associated with said bolt means for temporarily preventing longitudinal movement of said plate relative to said frame member until said bolt means is tightened, a brace rod having its inner end formed to engage said stud, and means adjustably fixing the outer end of said brace rod to said bracket at the outer end of said draft beam member.

30. A brace rod for a cultivator or the like, comprising an elongated member having adjacent one end a notch formed therein extending generally at an oblique angle with respect to the general longitudinal axis of said rod.

31. In a cultivator having a laterally extending beam structure, a brace rod having adjacent one end a notch formed therein extending generally at an oblique angle with respect to the general longitudinal axis of said rod, and means connecting the other end of said rod to the outer end of said beam structure.

THEODORE W. JOHNSON.